(12) United States Patent
Ko et al.

(10) Patent No.: US 7,642,576 B2
(45) Date of Patent: Jan. 5, 2010

(54) ROTATIONAL MEMS DEVICE HAVING PIEZO-RESISTOR SENSOR

(75) Inventors: Young-chul Ko, Yongin-si (KR); Jin-woo Cho, Seongnam-si (KR); U-hyuk Choi, Yongin-si (KR); Seong-ho Shin, Yongin-si (KR)

(73) Assignee: Samsung Electro-Mechanics Co., Ltd, Suwon-si (KR)

( * ) Notice: Subject to any disclaimer, the term of this patent is extended or adjusted under 35 U.S.C. 154(b) by 95 days.

(21) Appl. No.: 11/858,183

(22) Filed: Sep. 20, 2007

(65) Prior Publication Data
US 2008/0168670 A1 Jul. 17, 2008

(30) Foreign Application Priority Data
Jan. 15, 2007 (KR) .................. 10-2007-0004415

(51) Int. Cl.
*H01C 7/10* (2006.01)
(52) U.S. Cl. .................. 257/254; 257/418; 338/22 SD; 73/335.05
(58) Field of Classification Search ............... 257/254, 257/418; 338/22 SD; 73/335.05
See application file for complete search history.

(56) References Cited

U.S. PATENT DOCUMENTS

| | | | | |
|---|---|---|---|---|
| 3,920,492 A | * | 11/1975 | Sugita et al. | ................. 438/507 |
| 4,696,188 A | * | 9/1987 | Higashi | .................... 73/204.19 |
| 5,251,485 A | * | 10/1993 | Kondo | ..................... 73/514.16 |
| 5,648,618 A | | 7/1997 | Neukermans et al. | |
| 6,000,280 A | * | 12/1999 | Miller et al. | ................... 73/105 |
| 6,388,279 B1 | * | 5/2002 | Sakai et al. | ................. 257/254 |
| 6,388,300 B1 | * | 5/2002 | Kano et al. | ................. 257/419 |
| 6,683,358 B1 | * | 1/2004 | Ishida et al. | ................. 257/417 |
| 7,183,137 B2 | * | 2/2007 | Lee et al. | .................... 438/114 |
| 7,392,716 B2 | * | 7/2008 | Wilner | ................... 73/862.627 |
| 7,446,920 B2 | * | 11/2008 | Kato et al. | ................... 359/224 |
| 7,556,775 B2 | * | 7/2009 | McGill et al. | ................. 422/88 |
| 2005/0276726 A1 | * | 12/2005 | McGill et al. | ................. 422/96 |
| 2006/0125597 A1 | * | 6/2006 | Kamiya et al. | ............. 338/171 |
| 2006/0179958 A1 | | 8/2006 | Ohta et al. | |
| 2007/0000335 A1 | * | 1/2007 | Morimoto | ............. 73/862.045 |

FOREIGN PATENT DOCUMENTS

JP 2006085152 A 3/2006

OTHER PUBLICATIONS

Sasaki et al. "Piezoresistive rotation angle sensor integrated in micromirror." Japanese Journal of Applied Physics, Part 1, Apr. 2006, pp. 3789-3790, vol. 45, No. 4B.

Pfann et al. "Semiconducting stress transducers utilizing the transverse and shear piezoresistance effects." Journal of Applied Physics, Oct. 1961, pp. 2008-2019, vol. 32, No. 10.

* cited by examiner

*Primary Examiner*—W. David Coleman
(74) *Attorney, Agent, or Firm*—Sughrue Mion, PLLC

(57) ABSTRACT

A rotational micro-electromechanical system (MEMS) having a piezo-resistor sensor is provided. The rotational MEMS device includes a pair of torsion springs that support a stage, four resistors, at least one of the resistors being formed along a center axis of the torsion springs, and electrical signal cables connected to the four resistors, wherein at least one of the torsion springs is formed in a <100> direction on an n-type silicon substrate having a (100) plane, and the resistors formed on the at least one of the torsion springs are formed in a <110> group direction.

12 Claims, 5 Drawing Sheets

ROTATIONAL MEMS DEVICE HAVING PIEZO-RESISTOR SENSOR

CROSS-REFERENCE TO RELATED PATENT APPLICATIONS

This application claims priority from Korean Patent Application No. 10-2007-0004415, filed on Jan. 15, 2007, in the Korean Intellectual Property Office, the disclosure of which is incorporated herein in its entirety by reference.

BACKGROUND OF THE INVENTION

1. Field of the Invention

Apparatuses consistent with the present invention relate to a rotational micro-electromechanical system (MEMS) device having a piezo-resistor sensor and, more particularly, to a rotational MEMS device having a piezo-resistor rotation sensor on a torsion spring of an axis of rotation.

2. Description of the Related Art

A micro optical scanner includes a driving comb electrode formed on a stage and a fixed comb electrode formed on a fixing unit for driving the stage. In a structure in which the driving comb electrode and the fixed comb electrode are vertically formed, a rotation angle of the stage may be measured based on the change of the overlapping region between the driving comb electrode and the fixed comb electrode.

However, the rotation angle measured using a capacity of the vertical comb structure is not accurate due to an etching tolerance of the comb electrodes. Therefore, there is a need to develop a sensor that can correctly measure a rotation angle of a stage.

SUMMARY OF THE INVENTION

Exemplary embodiments of the present invention provide a micro-optical scanner having a sensor on a torsion spring to measure correctly a rotation angle of a stage.

According to an aspect of the present invention, there is provided a rotational micro-electromechanical system (MEMS) device comprising: a pair of torsion springs which support a stage; four resistors, at least one of the resistors being formed along a center axis of at least one of the torsion springs; and electrical signal cables connected to the four resistors, wherein at least one of the torsion springs is formed in a <100> direction on an n-type silicon substrate having a (100) plane, and the resistors formed on the at least one of the torsion springs are formed in a <110> group direction.

The resistors may be doped with a p-type impurity.

The p-type impurity may be boron.

The resistors may be formed in a direction perpendicular to each other on the torsion spring.

The resistors may be disposed in a W shape.

According to another aspect of the present invention, there is provided a rotational MEMS device comprising: a pair of torsion springs which support a stage; a cross-shaped resistor defining four ends and being formed along a center axis of at least one of the torsion springs; and electrical signal cables respectively connected to the four ends of the resistor, wherein the at least one of the torsion springs is formed on an n-type silicon substrate having a (100) plane and is formed in a <100> direction, and at least two ends of the resistor which are opposite to each other are formed in a <100> direction.

A reference voltage may be applied to two other ends of the resistor formed in a perpendicular direction to the two ends of the resistor formed in the <100> direction.

BRIEF DESCRIPTION OF THE DRAWINGS

The above and other features and aspects of the present invention will become more apparent by describing in detail exemplary embodiments thereof with reference to the accompanying drawings, in which.

DETAILED DESCRIPTION OF EXEMPLARY EMBODIMENTS OF THE INVENTION

Figure 1:
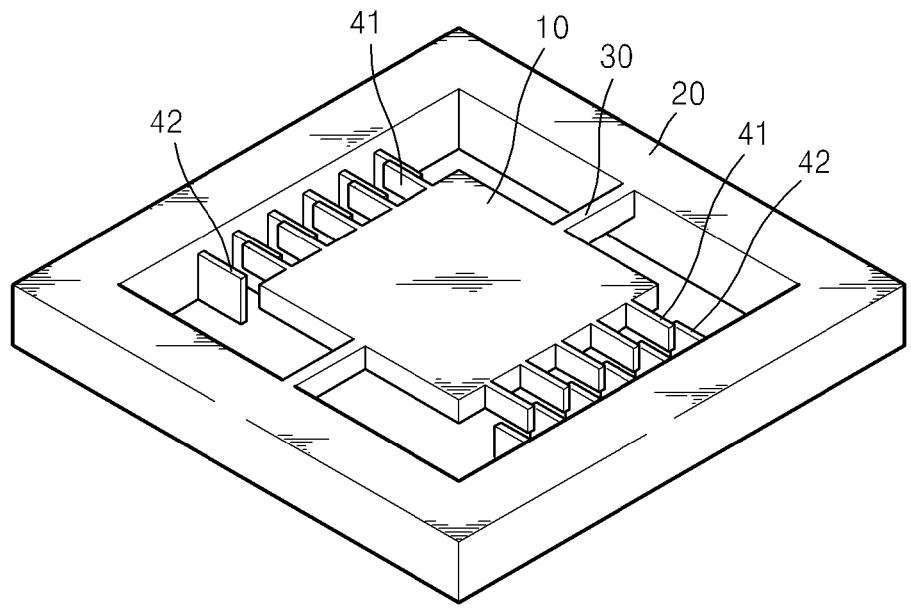
FIG. 1 is a perspective view illustrating a micro optical scanner to which a piezo-resistor sensor according to an exemplary embodiment of the present invention may be applied.

A micro optical scanner having a piezo-resistor sensor consistent with the present invention will now be described more fully with reference to the accompanying drawings in which exemplary embodiments of the invention are shown. In the drawings, the thicknesses of layers and regions are exaggerated for clarity, and like reference numerals refer to the like elements.

FIG. 1 is a perspective view illustrating a micro optical scanner to which a piezo-resistor sensor according to an exemplary embodiment of the present invention may be applied. Referring to FIG. 1, a fixed frame 20 is formed around a stage 10, and torsion springs 30 are formed between the stage 10 and the fixed frame 20. Driving comb electrodes 41 are formed on opposite sides of the stage 10 in a direction perpendicular to the direction in which the torsion springs 30 are formed, and fixed comb electrodes 42 are formed on the fixed frame 20 corresponding to the driving comb electrodes 41.

Each of the driving comb electrodes 41 and the fixed comb electrodes 42 is vertically formed, and the stage 10 rotates with respect to the torsion springs 30 due to an electrostatic force generated between the driving comb electrodes 41 and the fixed comb electrodes 42.

Figure 2:
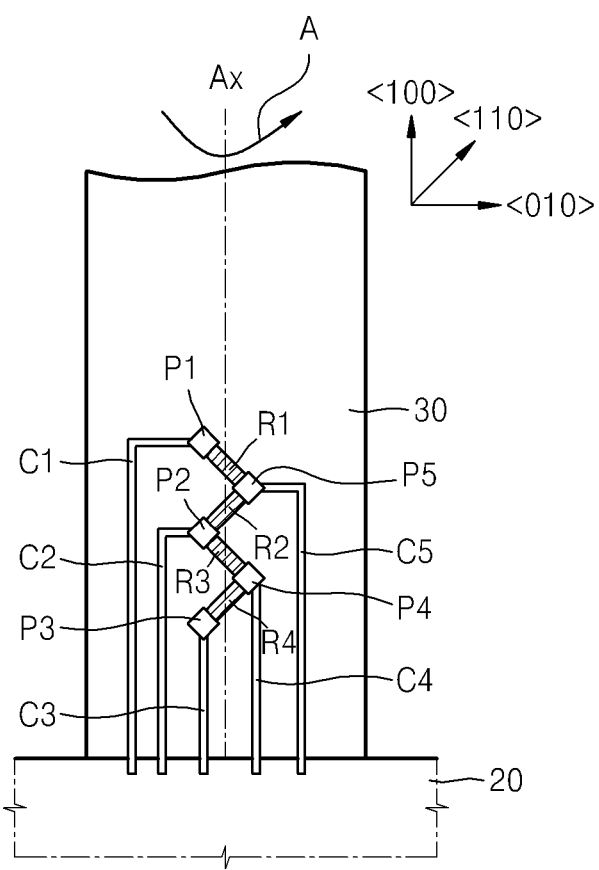
FIG. 2 is a partial plan view of the micro optical scanner of FIG. 1, according to an exemplary embodiment of the present invention.

FIG. 2 is a partial plan view of the micro optical scanner of FIG. 1, according to an exemplary embodiment of the present invention.

Referring to FIG. 2, four resistors R1 through R4 are formed on the torsion springs 30 formed of an n-type silicon substrate having a (100) plane, and pads P1 through P5 are formed on ends of the resistors R1 through R4. Each of the pads P1 through P5 is connected to the fixed frame 20 by cables C1 through C5.

The resistors R1 through R4 are doped with, for example, boron, which is a p-type impurity, the pads P1 through P5 and the cables C1 through C5 are patterned using, for example, Au, and the pads P1 through P5 may be formed to have an ohmic contact with the resistors R1 through R4. The resistors R1 through R4 slant with an inclination of 45°0 along a center axis AX of the torsion springs 30, and form a W shape. A piezo-resistor coefficient with respect to stress in a <110> direction is the largest on the n-type silicon substrate having a (100) plane. A large piezo-resistor coefficient denotes that a resistance change is large at the same stress. The resistors R1 through R4 are formed in a <110> group direction. When the torsion springs 30 rotate in a direction indicated by an arrow A, the resistors R1 and R3 receive a compression stress and the resistors R2 and R4 receive a tensile stress. Accordingly, the directions of a resistance change of the resistors R1 and R3 and the resistors R2 and R4 are opposite to each other.

Figure 3:
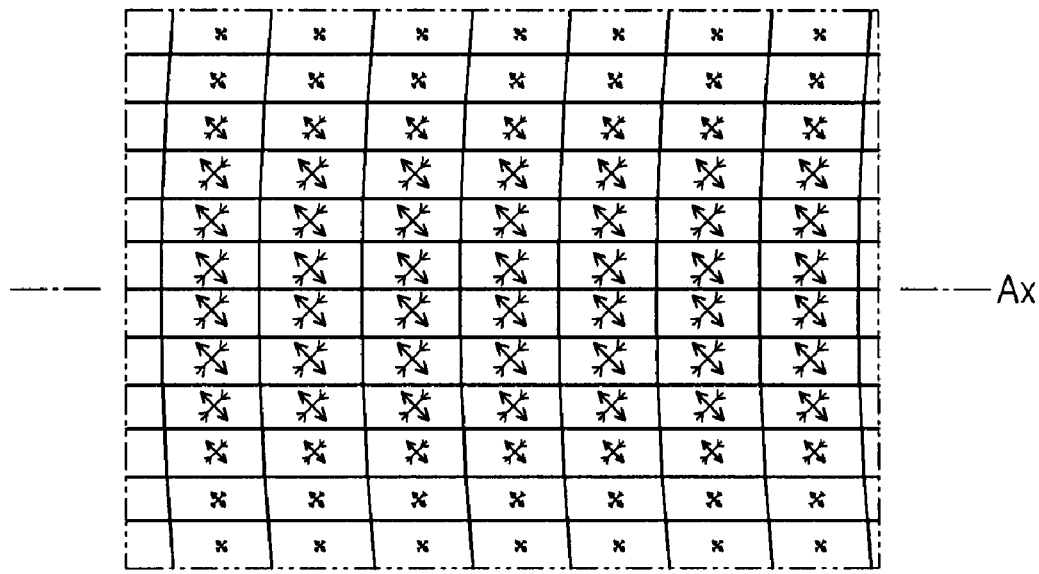
FIG. 3 shows a simulation result of stress distribution on a surface of a torsion spring of the piezo-resistor sensor of FIG. 1 when a stage rotates.

FIG. 3 shows a simulation result of stress distribution on a surface of the torsion springs 30 when the stage 10 rotates. Referring to FIG. 3, it is seen that stress is the largest along the center axis AX in the torsion springs 30, and strain is directed in a 45° with respect to the torsion springs 30. For this reason, the resistors R1 through R4 consistent with the present embodiment are disposed along the center axis AX of the torsion springs 30.

Figure 4:
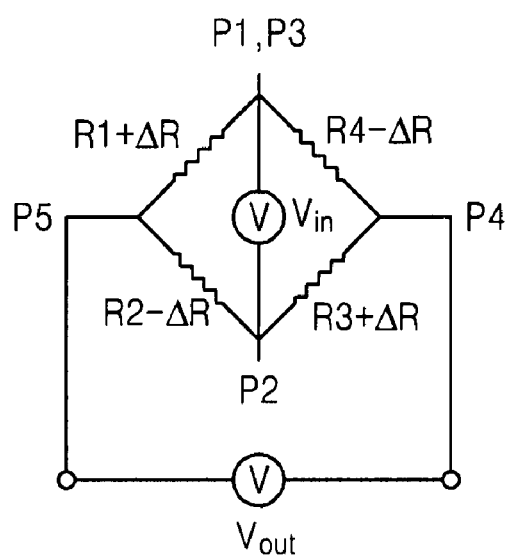
FIG. 4 is a Wheatstone bridge circuit diagram of the piezo-resistor sensor of FIG. 1 according to an exemplary embodiment of the present invention.
Figure 5:
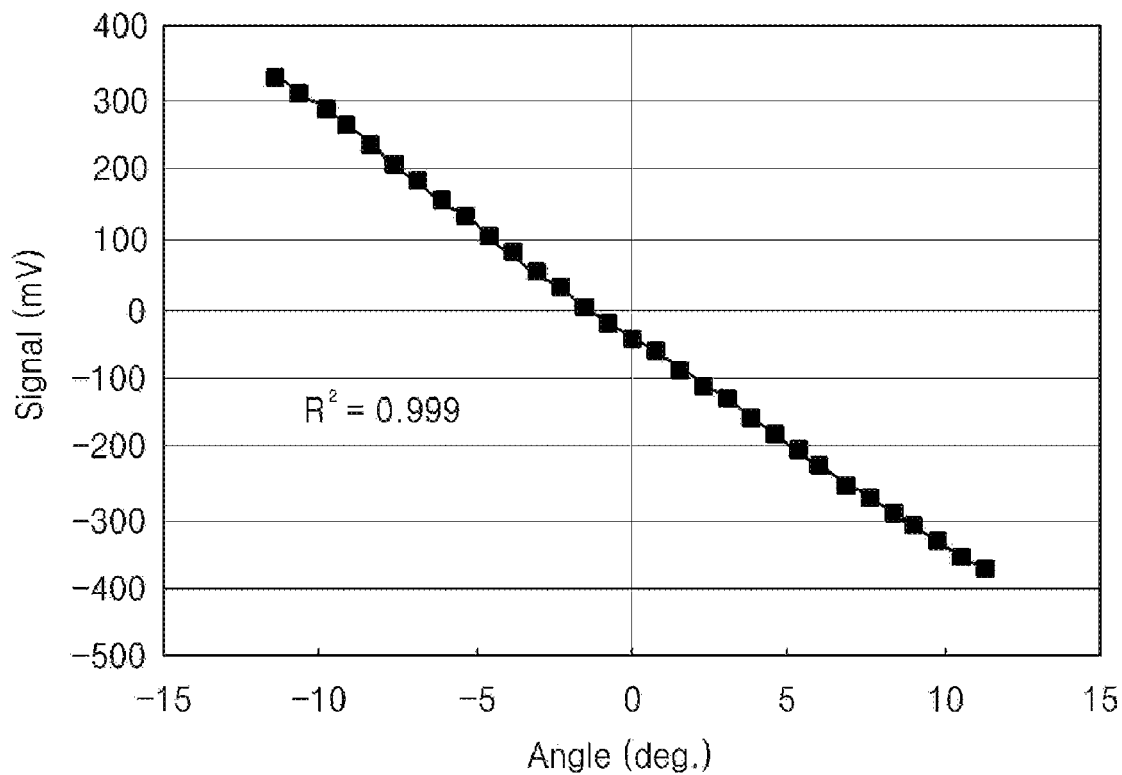
FIG. 5 is a graph showing signal outputs of the piezo-resistor sensor of FIG. 1 according to an exemplary embodiment of the present invention.

FIG. 4 is a Wheatstone bridge circuit diagram of the piezo-resistor sensor of FIG. 1 according to an exemplary embodiment of the present invention. FIG. 5 is a graph showing signal outputs of the piezo-resistor sensor, according to an exemplary embodiment of the present invention.

Referring to FIG. 4, after connecting the pads P1 and P3 to an end of a base power source and the pad P2 to the other end of the base power source, a reference voltage Vin is applied between the pads P1 and P3 and the pad P2. When a measuring voltage Vout is connected between the pads P4 and P5, the four resistors R1 through R4 form a Wheatstone bridge circuit. When the torsion springs 30 rotate in a direction indicated by the arrow A (refer to FIG. 2), the resistances of the resistors R1 and R3 increase and the resistances of the resistors R2 and R4 decrease. When the rotational direction of the torsion springs 30 is changed, the change directions of the resistances are also changed.

Referring to FIG. 5, in the piezo-resistor sensor having the Wheatstone bridge circuit of FIG. 4, resistance changes at a constant rate according to the rotation angle of the stage 10. When a reference voltage Vin of 5V is applied to the Wheatstone bridge circuit, the measuring voltage measured according to the rotation angle when the stage 10 is rotated has a linear characteristic as shown in FIG. 5. That is, the rotation angle of the torsion springs 30 may be reliably measured by using the piezo-resistor sensor consistent with the present invention.

In FIG. 2, the four resistors R1 through R4 are arranged on the torsion springs 30, however, the present invention is not limited thereto. That is, even if only the resistor R1 or only the resistors R1 and R2 are formed on the torsion springs 30 and the rest of the resistors are formed on the fixed frame 20, the rotation angle of the torsion springs 30 may be detected via the resistors R1 through R4 forming the Wheatstone bridge circuit.

Figure 6:
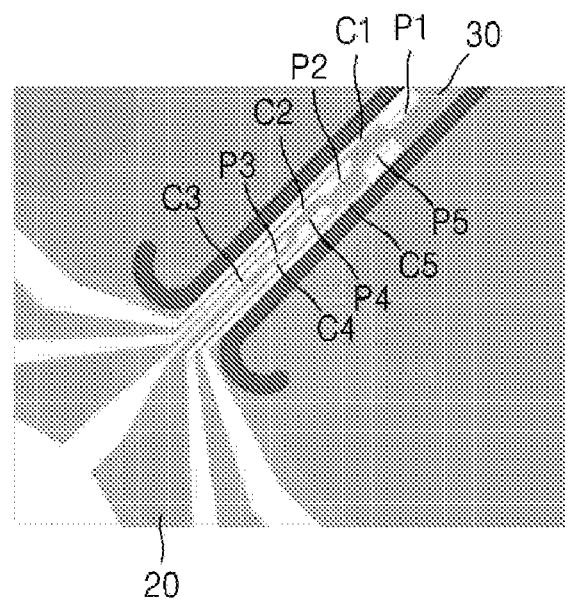
FIG. 6 is a portion of a photograph of a torsion spring of a micro optical scanner manufactured for the experiment of FIG. 5.

FIG. 6 is a portion of a photograph of a torsion spring 30 of a micro optical scanner manufactured for the experiment of FIG. 5. In FIG. 6, black portions of both sides of the torsion spring 30 are rotational spaces of the torsion spring 30. Pads P1 through P5 and cables C1 through C5 have been described with reference to FIG. 2. The resistors R1 through R4 are doped regions (not shown) formed in portions that connect the pads P1 through P5.

Figure 7:
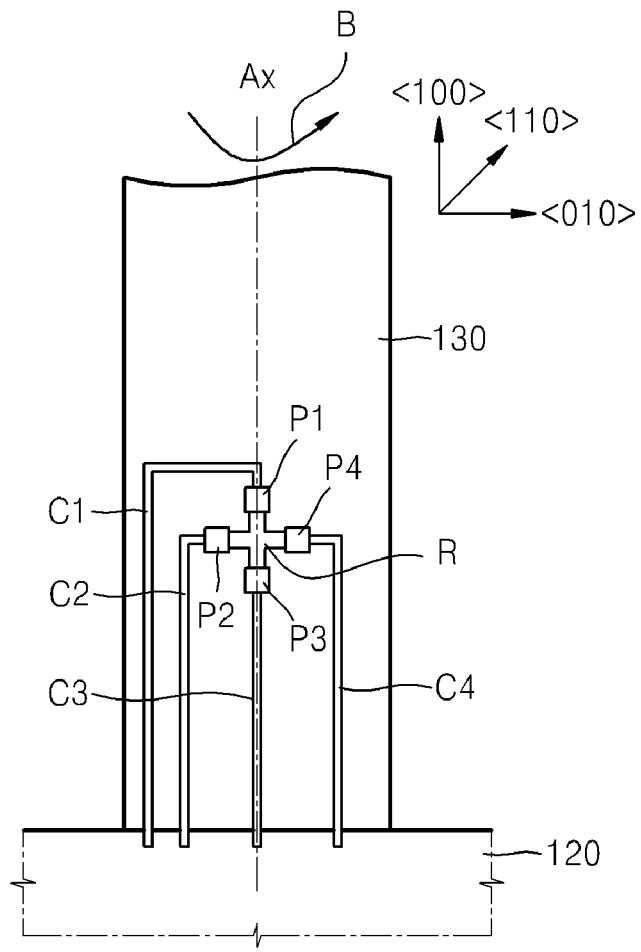
FIG. 7 is a partial plan view of a micro optical scanner having a piezo-resistor sensor according to another exemplary embodiment of the present invention.

FIG. 7 is a partial plan view of a micro optical scanner having a piezo-resistor sensor according to another exemplary embodiment of the present invention.

Referring to FIG. 7, a resistor R having a cross shape is formed on a torsion spring 130 formed of an n-type silicon substrate having a (100) plane. The torsion spring 130 formed in a <100> direction in which a shear-piezo coefficient is the largest on the n-type silicon substrate having a (100) plane. Four ends of the resistor R are formed in <100> group direction. A reference voltage is applied between the two ends that are opposite to each other along an axis AX direction of the torsion spring 130. A signal according to the variation of resistance is measured via two other ends opposite to each other in a direction perpendicular to the axis AX direction of the torsion spring 130.

Pads P1 through P4 are formed on ends of the resistor R. Each of the pads P1 through P4 extends to a fixed frame 120 by cables C1 through C4.

The resistor R is a doped region with, for example, boron, which is a p-type impurity, and the pads P1 through P4 and the cables C1 through C4 may be formed by patterning, for example, Au. The pads P1 through P4 may be formed to have an ohmic contact with the ends of the resistor R. When the torsion spring 130 rotates in a direction indicated by an Arrow B and when the torsion spring 130 rotates in an opposite direction indicated by the arrow B, the change directions of the resistance are opposite to each other.

The resistor R may be formed on the center axis AX where the deformation stress is the largest.

Figure 8:
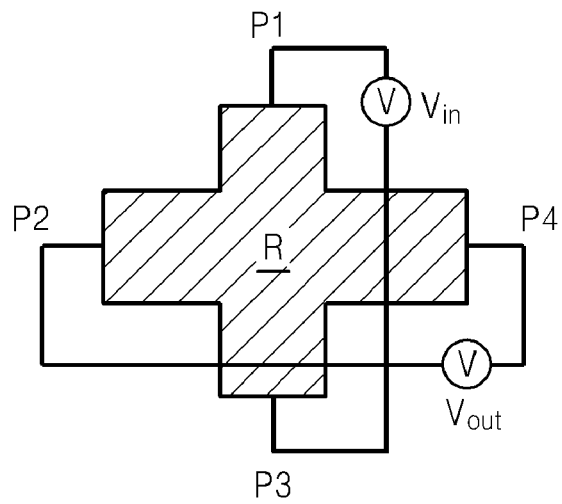
FIG. 8 is a circuit connected to the piezo-resistor sensor of FIG. 7, according to another exemplary embodiment of the present invention.
Figure 9:
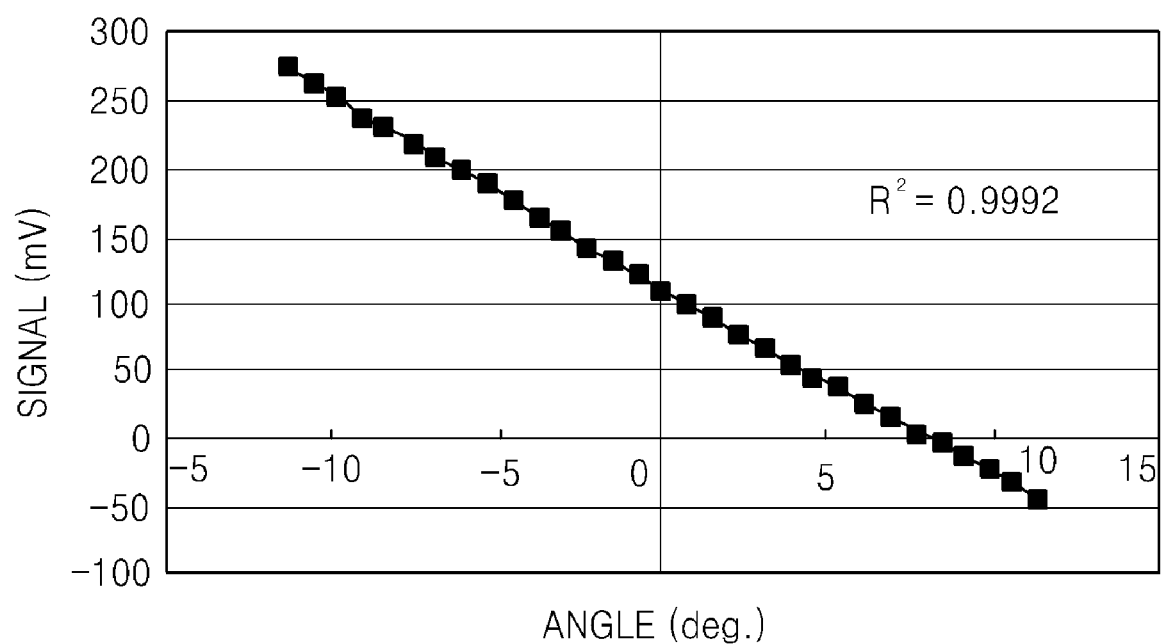
FIG. 9 is a graph showing signal outputs of the piezo-resistor sensor of FIG. 7, according to another exemplary embodiment of the present invention.

FIG. 8 is a circuit connected to the piezo-resistor sensor of FIG. 7. FIG. 9 is a graph showing signal outputs of the piezo-resistor sensor of FIG. 7.

Referring to FIG. 8, a reference voltage Vin is applied to the pads P1 and P3 and voltage Vout is measured between the pads P2 and P4.

Referring to FIG. 9, in a piezo-resistor sensor having the circuit of FIG. 8, a resistance changes at a constant rate according to the rotation angle of the stage 10 (refer to FIG. 1). When the reference voltage Vin of 5V is applied to the circuit, as shown in FIG. 9, the measured voltage Vout according to the rotation angle when the stage 10 is rotated has a linear characteristic. That is, the piezo-resistor sensor consistent with the present embodiment is reliable for the measurement of the rotation angle of the torsion spring 130.

As described above, consistent with the present invention, since a voltage of a resistor, which is a doped region formed on a torsion spring, linearly changes at a constant rate according to the rotation angle of the torsion spring, the actual angle of the torsion spring may be correctly detected by measuring the voltage of the resistor.

Also, the resistor, which is an element of the piezo-resistor sensor, may be formed in a small region of the torsion spring. Thus, thermal noise may be minimized.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A rotational micro-electromechanical system (MEMS) device comprising:

a pair of torsion springs which support a stage;

four resistors, at least one of the resistors being formed along a center axis of at least one of the torsion springs; and a plurality of electrical signal cables connected to the four resistors, wherein the at least one of the torsion springs is formed in a <100> direction on an n-type silicon substrate having a (100) plane, and the at least one of the resistors formed on the at least one of the torsion springs are formed in a <100> group direction, wherein the four resistors are separated from each other, and wherein each of the plurality of electrical signal cables is separately connected to one end of the four resistors.

2. The rotational MEMS device of claim 1, wherein the resistors are doped with a p-type impurity.

3. The rotational MEMS device of claim 2, wherein the p-type impurity is boron.

4. The rotational MEMS device of claim 3, wherein the resistors on the at least one of the torsion springs are formed in a direction perpendicular to each other.

5. The rotational MEMS device of claim 4, wherein the four resistors are disposed on the at least one of the torsion springs in a W shape.

6. The rotational MEMS device of claim 1, wherein the four resistors are arranged to form a Wheatstone Bridge.

7. The rotational MEMS device of claim 1, wherein the least one of the four resistors formed along a center axis of the torsion spring is rotated around the longitudinal direction of the torsion spring.

8. A rotational micro-electromechanical system (MEMS) device comprising:

a pair of torsion springs which support a stage;

a cross shaped resistor defining four ends and being formed along a center axis of at least one of the torsion springs; and a plurality of electrical signal cables, wherein separate electrical signal cables are each respectively connected to each the four ends of the resistor, wherein the torsion springs are formed on an n-type silicon substrate having a (100) plane, and at least two ends of the resistor which are opposite to each other are formed in a <100> direction, and two other ends of the resistor which are opposite to each other are formed perpendicularly to the <100> direction.

9. The rotational MEMS device of claim 8, wherein the resistor is doped with a p-type impurity.

10. The rotational MEMS device of claim 8, wherein a reference voltage is applied to the at least two ends of the resistor formed in the <100> direction.

11. The rotational MEMS device of claim 8, wherein the cross shaped resistor is rotated around the longitudinal direction of the torsion spring.

12. The rotational MEMS device of claim 9, wherein the p-type impurity is boron.

* * * * *